March 17, 1970     U. HOFMANN     3,500,790

MACHINE TOOL POSITIONING SCALE DRIVE

Filed May 15, 1967     6 Sheets-Sheet 1

Inventor:
Ulrich HOFMAN

March 17, 1970  U. HOFMANN  3,500,790
MACHINE TOOL POSITIONING SCALE DRIVE
Filed May 15, 1967  6 Sheets-Sheet 3
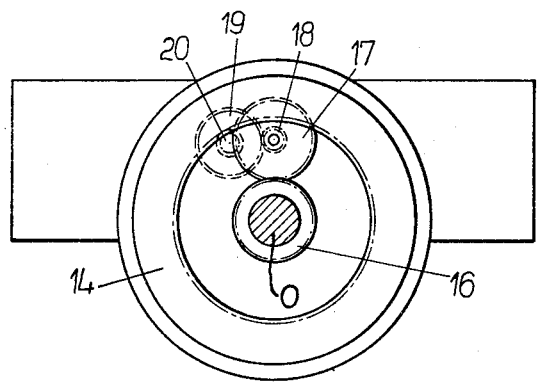
Fig. 3
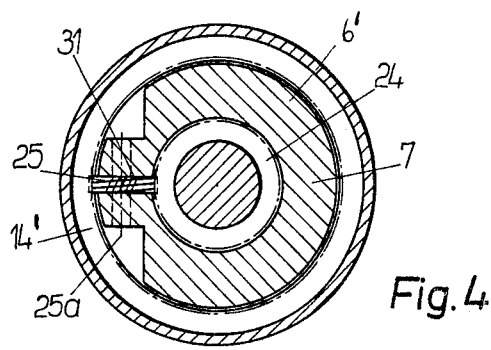
Fig. 4
Fig. 4a
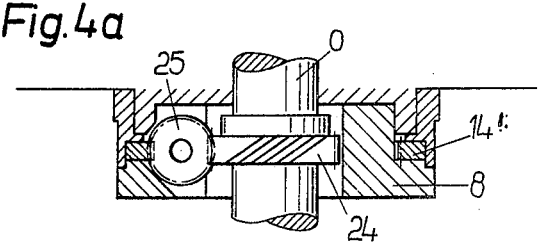

March 17, 1970         U. HOFMANN         3,500,790

MACHINE TOOL POSITIONING SCALE DRIVE

Filed May 15, 1967         6 Sheets-Sheet 5

United States Patent Office 3,500,790
Patented Mar. 17, 1970

3,500,790
MACHINE TOOL POSITIONING SCALE DRIVE
Ulrich Hofmann, Ebingen, Germany, assignor to Theodor Groz & Sohne & Ernst Beckert Nadelfabrik, Ebingen, Germany, a German firm
Filed May 15, 1967, Ser. No. 638,300
Claims priority, application Germany, May 17, 1966, H 59,420
Int. Cl. B23q 17/02
U.S. Cl. 116—115.5
9 Claims

ABSTRACT OF THE DISCLOSURE

A second positioning scale is arranged concentrically with the main spindle scale of a machine tool and a circular gear carrier element is interposed between the two scales. A fixed marker serving as a reference for both scales is placed on the carrier. The gearing in the gear carrier element also includes a worm gear having a shaft at right angles to the spindle and driving an internal gear which drives the positioning scale.

---

The present invention relates to a positioning scale drive arrangement for rotating spindles and particularly for feed spindles of machine tools such as lathes, milling machines, and the like.

Machine tools, such as lathes, milling machines, and the like utilize feed spindles which are driven either by hand, or automatically by a power feed drive. These spindles are supplied with a scale, rotating together therewith, which is marked off to indicate the feed, as determined by the pitch of the feed screw. Usually, the scale is marked in longitudinal units, such as millimeters, or inches (sub-divided further either in decimal, or binary fractions). The machine is adjusted with reference to a fixed marker on the machine; the feed distance then corresponds to a certain rotation of the spindle.

When the spindle feed exceeds one complete revolution, it is necessary to set the scale to zero and then to calculate the numbers of revolution of the spindle in dependence on the pitch of the spindle thread. For example, if a feed of 30.6 mm. is to be fed with a spindle thread pitch of 4 mm. per revolution, the machinist must count seven turns of the spindle and then advance the spindle from zero to the scale value of 2.6 mm. Thus, the desired feed can be reached only after a calculation.

In positioning work pieces, or cutters on milling machines, it is often impossible to arrange the feed in a positive direction. It is thus necessary to use a complementary value, with scales numbered in decreasing direction. Thus, in the above-identified example, if the positioning is in decreasing direction, seven entire revolutions are necessary and then the scale value of 1.4 mm. has to be set (complement to 4 mm.). Proceeding in this manner is time consuming and further leads to errors, which can be avoided only by stopping the machine and rechecking with manual measurements. Since milling machines often have different spindle pitches for the longitudinal feed, cross feed, and height adjustment of the tool, detailed attention is absolutely required. Measurement scales incorporated on the tool guides are often not used in actual practice, because constantly values have to be calculated on more than one scale, which means on more than one point on the machine, which is difficult to carry out during operation.

The customary arrangements of feed spindles in lathes are, that the numbers increase as the tool moves toward the inside, that is, toward the center of the drive chuck. Thus, with increasing scale value, the work piece diameter decreases. The machinist must therefore always calculate the difference between the tool position and the desired diameter of the work piece. If a particular turning tool is used to cut a rod to various diameters, then a reference diameter is usually chosen which is a readily remembered value. For example, if the scale is set to zero at a diameter of 20 mm. and diameters of 18.5, 14.8 and 11.2 mm. are to be turned, then the positions of the spindle (assuming a pitch of the spindle feed of 3 mm. per revolution, that is 6 mm. decrease in diameter of the work piece per revolution of the spindle) will be at 1.5, 5.2, and 2.8 plus one revolution. This is complicated and the careful machinist will have to spend the time to frequently recheck by actual measurement of the diameter.

If an internal diameter is to be cut, then the difficulty with the previously referred to decreasing scale value (that is, calculation to the complement) must be further considered. For the average machinist, the scales then are only useful for the marking of whole values, for example, millimeters (or hundreds of inches) and it is customary to make a fine cut, then measure, cut again, and measure again—a time consuming procedure. In gradually reaching the desired dimension, even more frequent measuring is necessary when cutting internal diameters than when cutting outside diameters.

It has been proposed, in order to make this calculation easier, to provide a second scale on the spindle which indicates the position of the spindle to be reached, and is geared down with respect to the spindle drive. This, so-called position scale, is usually co-axial to the spindle and driven over a planetary gearing. Such an arrangement avoids the calculations which are necessary to set the spindle; it has been found, however, to have disadvantages, interfering with wider adoption. Arranging the scales on the spindles on machine tools requires ordinarily only minor adaptation of the machine itself. Available space for locating such a spindle in usually very little, and the diameter of the scale cannot be deviated from because it is often given by the existing scales themselves. This, then, has as a result that the outer gear matching with the planetary gears has a definite limited diameter, which makes it difficult to obtain any desired whole-number correlation with the existing scale, for various pitches of feed screws. The further difficulty arose with the arrangement of the fixed marker for operating with the scales. It must be arranged in such a manner that it can be readily seen by the machine operator. The arrangement of planetary drives, however, can often only be satisfied when a projecting arm, or lever, is provided on the machine, which extends over both scales, provided with a window and a hairline on which the marker is engraved. Such an arm interferes with easy reading of the scales, and is otherwise undesirable on machinery.

It is an object of the present invention to provide a positioning scale drive arrangement which avoids the disadvantages of the prior art and which can be readily incorporated on existing machine tools and the like; and which further enables ready adaptation to various speed ratios to accommodate and match to various spindle feeds.

SUBJECT MATTER OF THE INVENTION

Arranged concentrically with the first, normal circular scale, supplied with a machine tool, and directly driven by the feed spindle, is a second scale. A circular carrier is interposed between the two scales, which circular carrier is fixed to the machine tool and carries speed reduction gearing matching a gear secured to the spindle on the one hand, and an internal gear formed on a ring carrying the second scale. The interposed circular carrier has an exposed ridge, preferably circular, on which the bench mark, or zero marker, for both the first spindle scale and the second, or positioning scale, is formed.

A reduction gearing can be mounted on a circular carrier directly, or on a holder screwed thereto, so as to provide readily exchangeable gear ratios. The circular carrier preferably has an axially projecting part fitting beneath the second scale, which is formed as a ring, and stacked onto the spindle, and thus providing for a compact assembly taking up but little, if any, space, in addition to the ordinarily provided scale.

The gearing itself uses spiral and worm gearing, depending upon design choice and availability of space, speed reduction ratios and the like.

The present invention permits adaptation of practically all machine tools utilizing feed spindles. It is possible to adapt the scales simply, and with precision, to various operating conditions. The scales are readily legible. The arrangement utilizes only simple, reliable parts, readily assembled and mounted, either on new machinery, or added as an attachment later.

The structure, organization and operation of the invention will now be described more specifically in the following detailed description, with reference to the accompanying drawings, wherein:

FIGURE 3 is a view similar to FIGURE 2a, illustrating a different transmission ratio;

FIGURE 4 is a sectional view along lines IV—IV of FIGURE 1, illustrating a different embodiment of the invention;

FIGURE 4a is an axial sectional view;

Figure 1A:
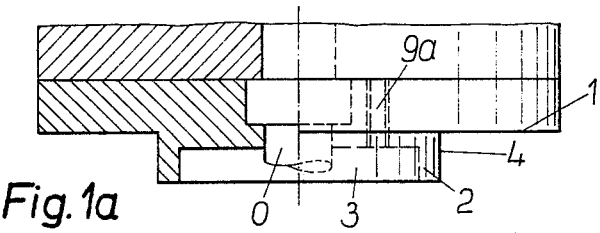
FIGURES 1a to 1d are components of the arrangement, in exploded view, partly in plan view, partly in section.
Figure 1B:
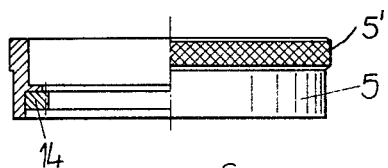
Figure 1C:
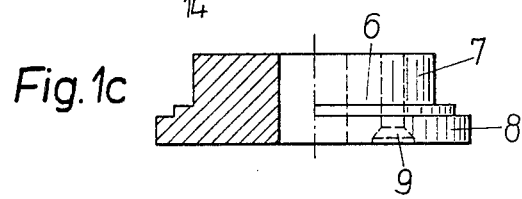
Figure 1D:
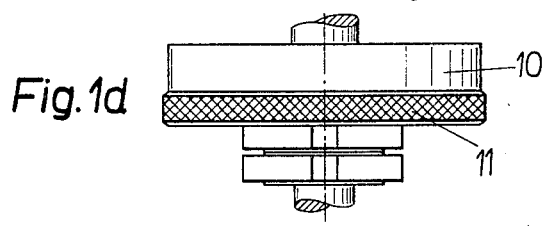
Figure 1:
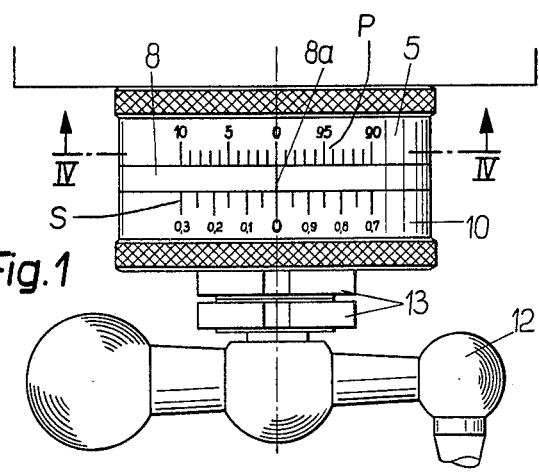
FIGURE 1 is a top view of a scale arrangement in accordance with the present invention.

Referring now to the drawings, and particularly to FIGURE 1, and the exploded views of FIGURES 1a to 1d: A spindle 0 for a machine tool, not further shown, passes through a part 1 of the machine tool. An attachment stub 2, separate or integral with the machine 1 is concentric to spindle 0. The attachment part 2 has a recess 3. The outer surface 4, which is cylindrical, of attachment part 2 retains a scale ring 5, which carries the position scale P indicated in detail in FIGURES 7 to 10, and shown partly in FIGURE 1. Scale ring 5 has a knurled end 5' and is rotatably fitted over surface 4 (see FIGURE 1b). Ring 5 is held in position by a carrier element 6 which has a projecting portion 7 extending into the recess 3, and secured to the machine tool by means of screws, for example, through screw holes 9, 9a. Recess 3 locates the projection 7 of carrier element 6 concentrically with respect to the spindle. It is, of course, also possible to omit recess 3 and secure the carrier element 6 directly over attachment 2, provided it can be secured concentrically with respect to the spindle 0.

Carrier element 6, secured to the machine against rotation, has a longitudinal ridge 8 which retains scale ring 5 in axial direction. Ridge 8 is provided with a fixed bench mark or marker 8a, serving as a reference for the scales of the positioning arrangement. A spindle scale ring 10 is then secured to the spindle in known manner, for example, by a friction fit and by means of a pair of nuts 13, screwed on a threaded end of the spindle itself. The spindle further is provided with the ordinary handle or hand wheel 12.

Spindle scale ring 10 carries the spindle scale S illustrated further in FIGURES 7 to 10. It, like scale P or ring 5, is provided with a knurled surface at its circumference 11 at the side remote from the scale, so that both scales P and S carried by rings 5 and 10 face the bench mark 8a on circumferential ridge 8 of the carrier element 6.

Figure 2A:
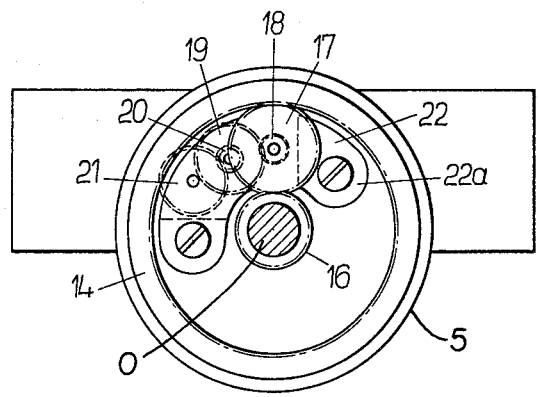
FIGURE 2a is a plan view along lines II—II of FIGURE 2, omitting, however, the carrier element.
Figure 2:
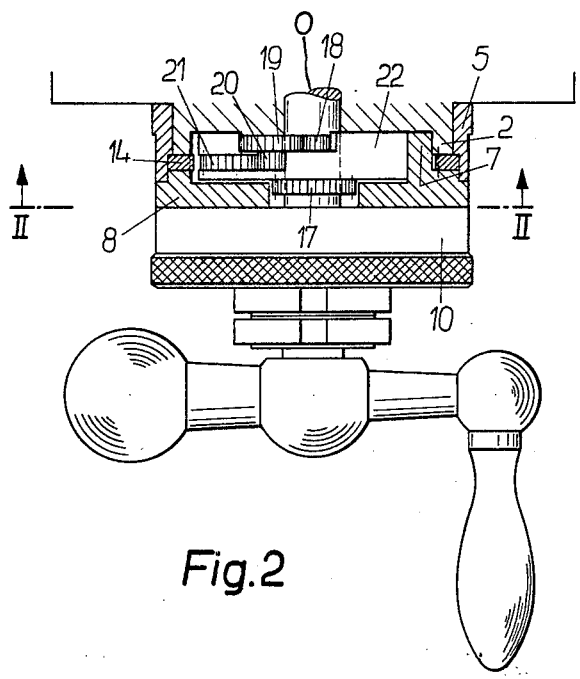
FIGURE 2 is a partly sectional view of the arrangement of FIGURE 1.

The position scale ring 5 is fairly thin; it is provided with an internal gearing 14 which is so arranged that it is beyond the facing surface of the attachment part 2 and has a little clearance therefrom (see FIGURE 2). A speed reduction gearing is arranged in the space between the spindle 0 and the carrier element 6, which interconnects the position scale ring 5, by means of its internal gearing 14 (FIG. 1b; FIG. 2), to the spindle 0 with a transmission ratio which is predetermined and which depends on the desired readings as well as on the pitch of the feed screws of the arrangement.

The gear reduction between the motion of the spindle 0 and the movement of the scale P depends on the pitch of the spindle, as well as on the range of movement desired by the ring 5 with respect to the benchmark 8a for the entire spindle traverse. For example, with a spindle pitch of 2 mm. per revolution, 50 revolutions of the spindle will correspond to a feed of 100 mm.; thus, the speed reduction must have a ratio of 1:50. If the spindle pitch is 3 mm. per revolution, the gear reduction would be 1:33-one third; if the spindle is to read directly for cutting of diameters, then this ratio has to be halved again, that is 1:33-one-third/two is equal 1:16-two-thirds.

FIGURES 2 and 2a illustrate in detail an embodiment of the present invention in which a pitch of the spindle of 4 mm. per revolution, and a feed of 100 mm. is assumed, thus requiring a speed reduction of 1:25. Spindle 0 has a gear wheel 16 (FIG. 2a) secured thereto, for example by means of a press fit, splined, or the like, which engages a gear 17 located in space left between the carrier element 6 and recess 3. The shaft of gear 17 is connected to a pinion 18 which engages a gear 19, journalled on a stub shaft arranged on attachment part 2. The first gear transmission provides a speed reduction of 1 to 2.5. A further pinion 20 is connected to the gear wheel 19, which matches a gear 21 journalled on carrier element 6, and providing a second speed reduction of 1 to 2.5. Gear 21 engages the internal gearing 14 directly. The diameter of internal gearing 14 is so chosen, that the third speed reduction provides a ratio of 1:4 so that all three stages reduce 1 to 2.5 x 2.5 x 4 is equal to 1:25. Larger speed reductions may require a further reduction stage, whereas smaller reductions may omit a stage.

FIGURE 3 shows an example which is similar to FIGURES 2 and 2a but is built for a spindle pitch of 5 mm. per revolution, so that a total speed reduction of 1:20 is needed. The gear 21 can be omitted, so that pinion 20 directly engages the internal gearing of gear wheel 14. If the gear ratio of the first reduction stage is again 1:2.5 then the relative diameters of pinion 20 and the internal gearing of gear 14 must have a ratio of 1:8, in order to obtain the desired speed reduction of 1:20. If even smaller reductions are desired, then the internal gearing of the ring 14 can be connected directly with gear 20, or with pinion 18.

The various gears and pinions 16 to 21 can be journalled as described, or can be supported on a special holding element 22, FIGURE 2, which is connected, for example by means of screws 22a in the space within the recess 3. Holding element 22 can be secured either to the machine attachment 2, or to the carrier element 6, and can be formed to match the available and required space.

Figure 4B:
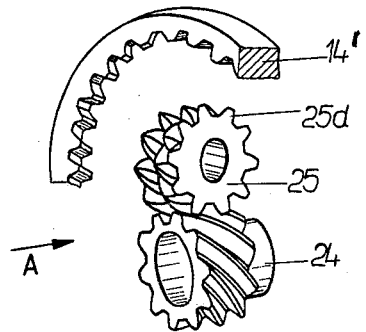
FIGURE 4b is a schematic view of the gear portions.
Figure 4C:
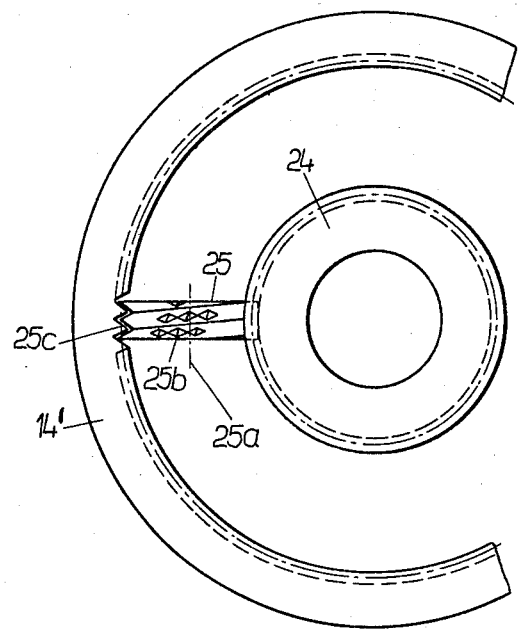
FIGURE 4c is a top view, seen in the direction of arrow A of FIGURE 4b, of the gear parts of FIGURE 4.
Figure 5:
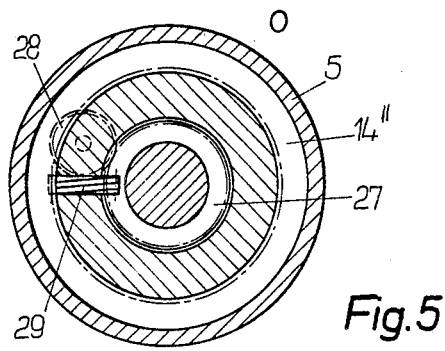
FIGURE 5 is an arrangement view similar to FIGURE 4, and illustrating yet another embodiment of the present invention.

The carrier element 6 can be arranged so that, it secures the various gears and supports them directy as seen in FIGURES 4 and 5. The arrangement of FIGURES 4 and 5 are particularly suitable when space is at a premium and only a few component parts are to be used. The various pinions, previously described, can be avoided, so that more space is available; particularly, in heavy machine tools, in which the diameter of the spindle is relatively large with respect to the diameter of the scales, the space for the reduction gearing can become very small and the embodiment discussed with respect to FIGURES 4 and 5 may be particularly advantageous.

Referring now to FIGURES 4 and 4a through 4c: a spiral gear 24 is secured to the spindle 0, matching a suitable spiral gear 25, having its shaft arranged at a right angle with respect to spindle 0. A shaft 25a is secured in a slit or recess 31 in projection 7 of the carrier element 6'. Gear 25, (FIGS. 4b and 4c) has a pair of gear tooth arrangements, One, 25d, matches the spiral gear 24 secured to the spindle. The other, 25c, is similar to a worm drive to match gearing 14' internal of ring 5. Between the two gear paths 25b, 25c, small teeth 25d will remain which have a generally rhombic base outline. Gear 25 is arranged directly in a space between internal gear 14' and the central spiral gear 24, with its shaft extending transversely to the spindle 0. In order to save space, and thus to accommodate a large diameter of spindle 0, gear 25 can be substantially smaller than the spiral gear 24 on spindle 0. For a pitch of 4 mm., 100 mm. feed length requires 25 revolutions of the spindle. For a 1:2 relationship, gear 25 must then turn fifty times. In an example (with reference to FIGURE 4) the diameter of the internal gearing 14' was 48 mm., so that the circumference is approximately 150 mm. This then requires a pitch of the worm of 150:50=3 mm. In order to avoid having coarse teeth 25d, it is preferred to have two or three convolutions engaged for the gearing 25c (see FIGURE 4c). This arrangement permits a step down gearing for practically any pitch of the spindle.

Figures 5A, 5B:
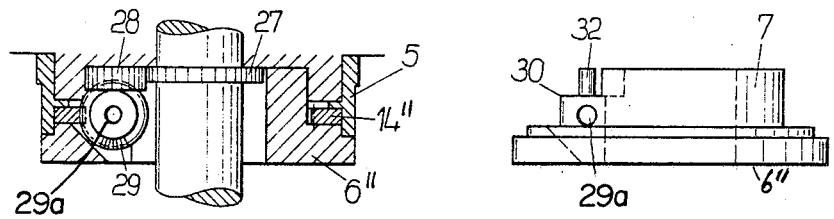
FIGURE 5a is an axial sectional view of the arrangement of FIGURE 5.
FIGURE 5b is a detailed top view of the carrier element of FIGURE 5.
Figures 5C, 6:
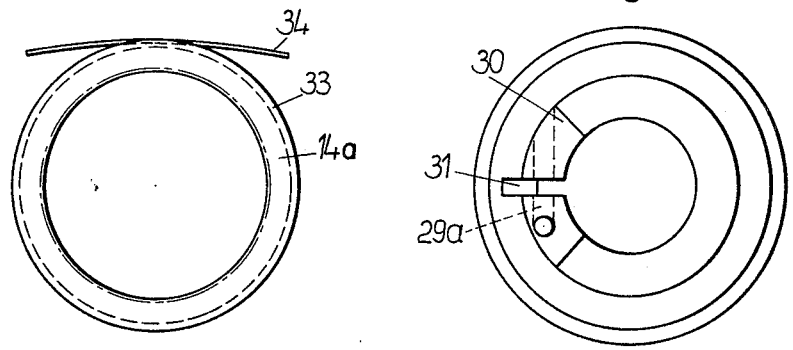
FIGURE 5c is a side view of the carrier element.
FIGURE 6 is a schematic side view of the gear arrangement according to FIGURE 1b.

A further and advantageous solution is illustrated in FIGURES 5, 5a to 5c. In this arrangement a bevel gearing is used. A gear 27 is secured to shaft 0. It matches with a pinion 28 which is preferably smaller than gear 27 to save space. Matching with gear 28 is a bevel gear 29 which is secured to rotate about an axis which extends at a right angle to the spindle 0. Gear 29 has a worm-like gearing on the outside thereof, matching with the internal gearing of the gear 14" in driving engagement with ring 5. In the region of its plane face, it has a crown or bevel gearing which matches with the gears of wheel 28. The right-angle transmission between the two gears 28, 29 can be an ordinary crown gear, a bevel gear or by means of an intermediate conical or bevel pinion. Gear wheel 28 is held on a shaft 32 and located in a recess 30 on the carrier element 6" as seen best in FIGURES 5a and 5b. Gear 29 is journalled at 29a, for example, within a slit 31 formed in carrier element 6". The accuracy of position of the shaft for these gears does not have to be very great and thus the components can be manufactured easily and without extreme precision. The position of the gear 27 can be either behind the gear 14", as shown in FIGURE 5a, or in front of the gear 14" and engage the gear 29 directly without use of the intermediate gear 28.

The position scale P and thus ring 5 is preferably independent of the gear 14 (or 14' or 14") in order to set the scale easily to zero. A spring 34, engaging in a groove 33, formed in the outside of a gear ring 14a, at best seen in FIGURE 6, presses against the inside of scale ring 5 (not shown in FIGURE 6). Other similar friction arrangements may well be used as well known in the art.

Figure 7:
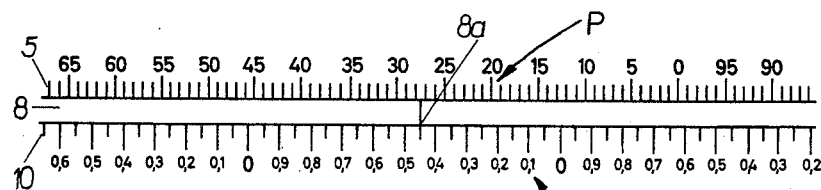
FIGURE 7 illustrates scales of the arrangement in accordance with FIGURE 1, in a developed view for longitudinal turning.

FIGURES 7 to 10 illustrate several typical scale arrangements both for the position scale ring 5 carrying scale P and for the spindle scale 10 carrying scale S. FIGURE 7 shows a scale subdivision which can be used, for example, for the longitudinal feed of a machine tool of a lathe. The value opposite the bench mark 8a is 27.45 mm., clearly, it can be read off immediately.

Figure 8:
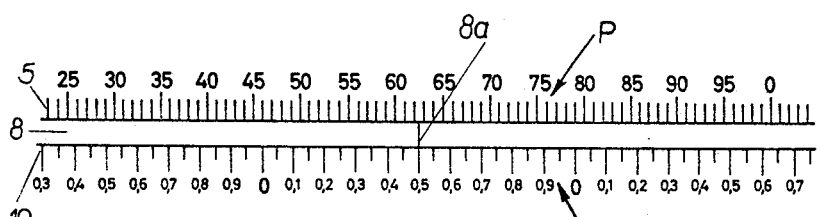
FIGURE 8 is a scale, and developed view to set diameters in lathes.

FIGURE 8 shows scale arrangements for the cross feed spindle of a lathe, to support a machine tool to cut an outside, or inside diameter of a work piece. The value indicated is 62.5 mm. and immediately, directly indicates the work piece diameter.

Figure 9:
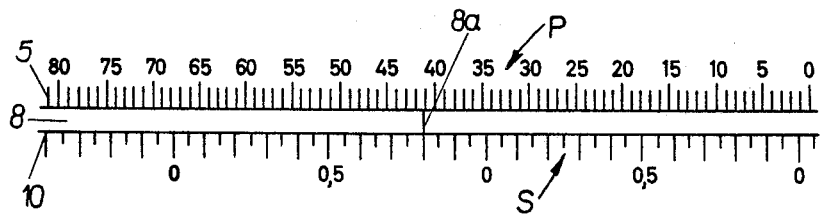
FIGURE 9 is a scale arrangement for a milling machine, in developed view.

FIGURE 9 illustrates a scale arrangement which is particularly adapted for milling machines. The scale value set is 41.2 and, as seen, can be read off directly.

Figure 10:
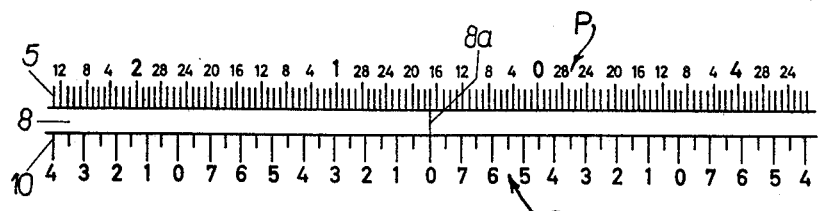
FIGURE 10 is a scale arrangement for a one-eighth inch pitch and indicating division into thirty-seconds of an inch, in developed view.

FIGURE 10 illustrates a scale subdivision set in thirty-seconds of inches. The value set is $1\%_{32}''$. Movement of the spindle scale S from 0 to 0 moves the scale P by $1\!/\!_{32}''$. If the inches are subdivided into decimal parts of inches, the scales P and S on scale rings 5 and 10 can be arranged in such a manner that the scale P indicates in tenths of inches and is set for a field of, for example, 10 inches, whereas the scale S of the spindle ring 10 then indicates hundreds and thousands of inches.

FIGURES 7 to 10 illustrate that the scale ring 5 is set for the entire feed distance—or a very substantial feed distance to be expected in machining work pieces and contains a corresponding continuously progressing even subdivision and corresponding numbering. Thus, the position scale P in accordance with FIGURE 7 corresponds to a feed of 100 mm., whereas position scale P in accordance with FIGURE 10 corresponds to a feed of 5 inches.

The spindle scale S on ring 10 is subdivided into divisions which are equal, join each other and are again likewise numbered. These subdivisions, in contrast to the scale P, are always limited by numbering 0—0, and between the zero marks are evenly subdivided. The length of the subdivision is determined by the feed distance of one revolution, and corresponds further to one subdivision of the position scale P. This means, see, for example, FIGURE 10, that when the spindle is turned by the length of one subdivision of the scale S, that is for one revolution, the scale P will progress by one subdivision. In FIGURE 10, this means that scale P will move, for example, from $1\%_{32}''$ to $1\%_{32}''$.

FIGURES 7, 9, and 10 illustrate a numbering which is so arranged that when the spindle is turned to the right, the spindle values increase, as is customary for longitudinal turning, or for positioning of work pieces with milling machines or boring machines; FIGURE 8 illustrates a reverse scale, so that for turning of diameters, a movement of the spindle to the right gives decreasing values of scales, which preferably are already subdivided by two in order to directly indicate the diameter of a work piece being rotated by a lathe.

Various structural changes and modifications as determined by the requirements of particular applications or uses, or particular machine tools may be made without departing from the inventive concept.

What is claimed is:

1. A positioning scale drive arrangement for spindles rotating with respect to an apparatus, and particularly for machine tool feed spindles comprising:
  a first circular scale carrier (10) directly driven by said spindle (0) and carrying a first scale (S);
  a second scale carrier (5) coaxial with said first scale carrier (10) and carrying a second scale (P);
  means (14) for driving said second scale carrier and mounted internally of said second scale carrier;
  a circular carrier element (6) located intermediate said scale carriers (5, 10) surrounding said spindle and being fixed to said apparatus and carrying a fixed marker (8a) cooperating with both said first (S) and said second (P) scales;
  and speed reduction gear means mounted on said carrier including at least one gear means having a shaft extending in a direction transverse to the axis of said spindle, said gear means comprising a worm gear in driving engagement with said means for driving said second scale carrier and with said spindle.

2. Arrangement as claimed in claim 1 including a spiral gear (FIGURE 4: 24) connected to said spindle (0), said carrier element being formed with a radial slit (31);
  said worm gear (25) having teeth (25a) matching said spiral gear and being journalled to rotate in said slit,
  and an internal gear (14') matching said worm gear in driving engagement with the inside of said second scale carrier and in engagement with said worm gear and forming said means driving said second scale carrier.

3. Arrangement as claimed in claim 1 wherein the gear ratios and the scale markings of the second scale are matched together to provide for direct reading of spindle feed on the second scale within a predetermined range.

4. Arrangement as claimed in claim 1 wherein the first scale is subdivided into equal divisions corresponding directly to the spindle feed for a single revolution of the spindle; and the second scale is subdivided into equal subdivisions, each of which corresponds to one revolution of the spindle, and thus to the first scale.

5. Arrangement as claimed in claim 1 wherein said spindle (0) has a circular gear wheel (27) connected thereto (FIGURE 5) and wherein said speed reduction gear means comprises intermediate bevel gearing (28, 29) in driving engagement with said worm gear; and
  said means driving said second scale carrier comprises an internal gear (14") in driving engagement with said worm gear and with said second scale carrier.

6. Arrangement as claimed in claim 5 wherein said carrier (6") is formed with a pair of shafts (32, 32a), one of said shafts being parallel to said spindle (0) and the other (32a) at right angles thereto; said shafts carrying said bevel gearing.

7. Arrangement as claimed in claim 1, wherein the carrier element (6) is a cylindrical, stepped element surrounding said spindle and having a circular projecting ridge (8), said marker being formed on said ridge; and
  said second scale carrier (5) is a ring surrounding said element (6) in a region of a diameter less than the diameter of said circular ridge (8).

8. Arrangement as claimed in claim 1, wherein said means driving said second scale carrier comprises a cylindrical ring (14a) having an internal gearing (14, 14', 14") formed thereon; and resilient friction means (FIG. 6: 33, 34) interconnecting said second scale ring (5) and said cylindrical ring (14a).

9. A machine tool scale adapter comprising a circular carrier element (6) adapted to be secured to said machine tool, stacked over the tool feed spindle (0) in a plane transverse to said spindle and bearing against a scale ring (10) carrying a first scale (S) of said tool with one side of said carrier element;
  a bench mark reference (8a) formed on a circumference of said circular carrier adapted to cooperate with the scale (S) on said scale ring (10);
  a recess formed in said carrier element (6) and speed reduction gearing including a worm gear member journalled in said recess and having a shaft axis transverse to the axis of said spindle and located to engage the machine tool spindle;
  a second scale ring (5) carrying a second scale (P) located against the other side of said circular carrier element;
  means driven by said worm gear member for rotating each of said scale rings relative to said circular carrier.

References Cited
UNITED STATES PATENTS

| | | | |
|---|---|---|---|
| 1,760,938 | 6/1930 | Edgar | 116—115 X |
| 2,273,956 | 2/1942 | Hall | 116—115 |
| 2,743,699 | 5/1956 | Hollis | 116—115 |
| 3,315,633 | 4/1967 | Rabinow | 116—115.5 |
| 1,235,437 | 7/1917 | Chard | 116—115.5 |
| 1,950,675 | 3/1934 | Heynau | 116—115.5 |

LOUIS R. PRINCE, Primary Examiner

D. M. YASICH, Assistant Examiner